US010045094B2

(12) United States Patent
Yamagishi (10) Patent No.: US 10,045,094 B2
(45) Date of Patent: Aug. 7, 2018

(54) CONTENT SUPPLY DEVICE, CONTENT SUPPLY METHOD, PROGRAM, TERMINAL DEVICE, AND CONTENT SUPPLY SYSTEM (71) Applicant: Saturn Licensing LLC, New York, NY (US)

(72) Inventor: Yasuaki Yamagishi, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 14/903,134

(22) PCT Filed: Aug. 12, 2014

(86) PCT No.: PCT/JP2014/071262
§ 371 (c)(1),
(2) Date: Jan. 6, 2016

(87) PCT Pub. No.: WO2015/029768
PCT Pub. Date: Mar. 5, 2015

(65) Prior Publication Data
US 2016/0192036 A1 Jun. 30, 2016

(30) Foreign Application Priority Data
Aug. 26, 2013 (JP) .................. 2013-174133

(51) Int. Cl.
H04N 21/854 (2011.01)
H04N 21/6405 (2011.01)
(Continued)

(52) U.S. Cl.
CPC ....... H04N 21/85406 (2013.01); H04L 67/02 (2013.01); H04L 67/14 (2013.01);
(Continued)

(58) Field of Classification Search
CPC ......... H04N 21/85406; H04N 21/8586; H04N 21/84; H04N 21/2353; H04N 21/6405; H04L 67/14; H04L 67/02
See application file for complete search history.

(56) References Cited

U.S. PATENT DOCUMENTS

2006/0015568 A1   1/2006  Walsh et al.
2010/0121963 A1*  5/2010  Peng .................. H04N 21/643
                                                        709/228
(Continued)

FOREIGN PATENT DOCUMENTS

WO    WO 2007/068290 A1    6/2007

OTHER PUBLICATIONS

ETSI TS 126 346 VII.50 (Jul. 2013).*
(Continued)

Primary Examiner — Benjamin R Bruckart
Assistant Examiner — Aklil M Tesfaye
(74) Attorney, Agent, or Firm — Oblon, McClelland, Maier & Neustadt, L.L.P.

(57) ABSTRACT

The present disclosure relates to a content supply device, a content supply method, a program, a terminal device, and a content supply system in which the reception side that acquires a FLUTE session can be notified of the reception mode. A content supply device according to the present disclosure includes: a fragment stream generating portion that generates a fragment stream on the basis of source data of content; a FLUTE-stream generating portion that generates a FLUTE stream from the generated fragment stream; an SDP creation portion that creates an SDP including a reception mode in the case of a reception side receiving a FLUTE session including the FLUTE stream; and a multicast delivery portion that delivers the FLUTE stream over FLUTE multicast and, prior to delivery of the FLUTE stream over FLUTE multicast, delivers the SDP over FLUTE multicast. The present disclosure can be applied to a system that delivers content over FLUTE multicast.

20 Claims, 6 Drawing Sheets (51) Int. Cl.
*H04N 21/858* (2011.01)
*H04N 21/84* (2011.01)
*H04N 21/235* (2011.01)
*H04L 29/08* (2006.01)

(52) U.S. Cl.
CPC ..... *H04N 21/2353* (2013.01); *H04N 21/6405* (2013.01); *H04N 21/84* (2013.01); *H04N 21/8586* (2013.01)

(56) References Cited

U.S. PATENT DOCUMENTS

| | | | | |
|---|---|---|---|---|
| 2010/0287461 | A1* | 11/2010 | Paila | H04N 21/235 715/236 |
| 2011/0211517 | A1* | 9/2011 | Moscibroda | H04H 20/63 370/312 |
| 2014/0040959 | A1* | 2/2014 | Oyman | H04N 21/6131 725/62 |
| 2014/0307734 | A1* | 10/2014 | Luby | H04L 12/18 370/390 |

OTHER PUBLICATIONS

Mitsuhiro Hirabayashi, "Realizing the Uninterrupted Video Distribution in the Existing Web Server: An Exposition on "MPEG-DASH", the Next-Generation Standard of Video Distribution", Dec. 2011, Sony Corporation.
Colin Perkins, "Re: [MMUSIC] SDP Session Description for Flute Sessions", Email, May 6, 2004.
"Release 11" Jun. 19, 2013, 3GPP.
Extended European Search Report dated Feb. 23, 2017 in European Patent Application No. 14839446.3.

* cited by examiner

```
v=0
o=user123 2890844526 2890842807 IN IP6
2201:056D::112E:144A:1E24
s=File delivery session example
i=More information
t=2873397496 2873404696
a=mbms-mode:broadcast 123869108302929 1
a=FEC-declaration:0 encoding-id=1
a=source-filter: incl IN IP6 * 2001:210:1:2:240:96FF:FE25:8EC9
A=flute-tsi:3 m=application 12345 FLUTE/UDP 0
c=IN IP6 FF1E:03AD::7F2E:172A:1E24/1
b=64
a=lang:EN
a=FEC:0
a=single-fmt:video H264/90000 promiscuous
```

SESSION DESCRIPTION

MEDIA DESCRIPTION

CONTENT SUPPLY DEVICE, CONTENT SUPPLY METHOD, PROGRAM, TERMINAL DEVICE, AND CONTENT SUPPLY SYSTEM

TECHNICAL FIELD

The present disclosure relates to a content supply device, a contest supply method, a program, a terminal device, and a content supply system, and in particular to a content supply device, a content supply method, a program, a terminal device, and a content supply system suited for use when delivering content over FLUTE (File Delivery over Unidirectional Transport) multicast.

BACKGROUND ART

In recent years, the mainstream of streaming services utilizing the Internet has been OTT-V (Over The Top Video), and as a globally standardized moving picture delivery protocol that can be used for it, there is known the MPEG-DASH (Moving Picture Experts Group-Dynamic Adaptive Streaming over HTTP, hereinbelow called DASH), which uses HTTP similar to the browsing of websites and the like (for example, refer to Non-Patent Literature 1).

In DASH, adaptive streaming technology is achieved. That is to say, on the content supply side, multiple streams of the same content but whose bit rates differ by differences in image quality and field angle size are prepared and delivered. On the other hand, the reception side can select, receive and play back the optimum stream in accordance with the Internet communication environment its own decoding capability, and the like among the plurality of streams the supply side has prepared.

Metafiles called MPD (Media Presentation Description) are supplied from the supply side to the reception side so that the reception side can adaptively select, receive, mid play back streams.

The address (url information) of the server supplying streams of chunked content (media data such as Audio/Video/Subtitle) is described in the MPD. The reception side, based on the url information, accesses the server that is the supply source of fee content to request a stream, receives the stream delivered over HTTP unicast from the server m accordance with the request, and plays it back.

Figure 1:
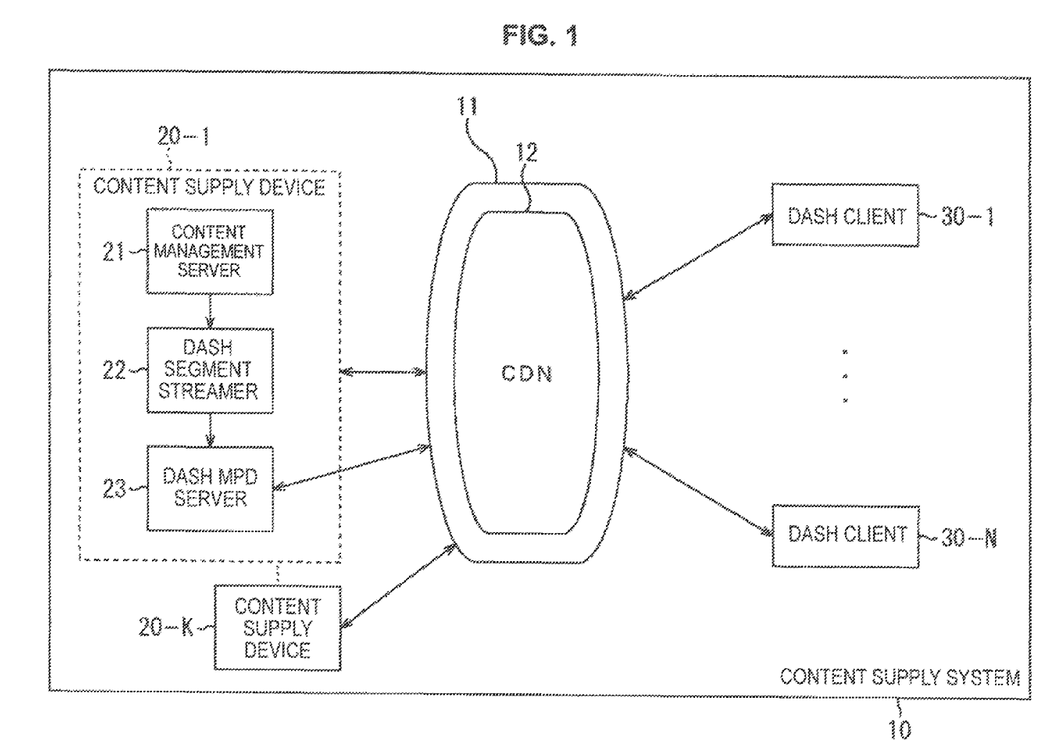
FIG. 1 is a block drawing that shows an example of the constitution of a conventional content supply system.

FIG. 1 shows an example of the constitution of a content supply system that streams contest based on DASH.

This content supply system 10 is constituted from a plurality of content supply devices 20 that supply content and a plurality of DASH clients 30 that receive and play back content. The DASH client 30 is connected to the content supply device 20 via a CDN (Contents Delivery Network) 12 that utilizes the Internet 11.

The content supply device 20 delivers a plurality of streams having the same content but different bit rates. The contest supply device 20 has a content management server 21, a DASH segment streamer 22, and a DASH MPD server 23.

The content management server 21 manages the source data of content for delivery to the DASH client 30, generates a plurality of streaming data of different bit rates from the source data and outputs them to the DASH segment streamer 22.

The DASH segment streamer 22, by dividing each streaming-data temporally into segments, to generate a segment stream such as Fragmented MP4 and the like, and files and holds the generated segment stream. Moreover, the DASH segment streamer 22, as a WEB server, in accordance with a request (HTTP request) from the DASH client 30, delivers over HTTP unicast the file of the segment stream it holds to fee request source. Furthermore, the DASH segment streamer 22 notifies the DASH MPD server 23 of metadata including the address expressing fee supply source of the segment stream file.

The DASH MPD server 23 generates an MPD containing an address or the like indicating the supply source (that is, the DASH segment streamer 22) of the segment stream file. Also, the DASH MPD server 23, as a WEB server, is accordance with a request (HTTP request) from the DASH client 30, delivers over HTTP unicast the generated MPD to the request source.

The DASH client 30 requests the MPD from the DASH MPD server 23, and in response, receives the MPD delivered over HTTP unicast. Moreover, the DASH client 30, based on the received MPD, requests a segment stream file from the DASH segment streamer 22, and in response receives and plays back the segment stream file that is delivered over HTTP unicast.

Note that the CDN 12 includes a caching server (not illustrated), and the caching server caches the MPD and segment stream file delivered over HTTP unicast via the CDN 12. The caching server, instead of the DASH MPD server 23 or the DASH segment streamer 22 as WEB servers, can deliver over HTTP unicast the cached MPD and segment stream file to the DASH client 30 of the request source.

CITATION LIST

Non-Patent Literature

Non-Patent Literature 1: Hirabayashi, Mitsuhiro, "Realizing Moving Image Delivery With No Drop-outs in as Existing Web Server." *Nikkei Electronics*, Mar. 19, 2012

SUMMARY OF INVENTION

Technical Problem

As mentioned above, in DASH, adaptive streaming technology is achieved using HTTP unicast delivery.

If the reception side is compatible not only with HTTP unicast delivery but also FLUTE multicast delivery using for example a mobile telephone communication network, it is desirable to use it for delivering a stream to be able to adoptively select a stream on the reception side.

That is, in FLUTE multicast delivery, since the QoS (guaranteed band/delay) is guaranteed, in the case of delivering content in which a real-time property is respired such as live video, compared to HTTP unicast delivery stable reception and playback can be expected on the reception side.

However, in the case of the reception side receiving and playing back a stream that is delivered over FLUTE multicast, when, after starting to receive the FLUTE session, the FDT contained therein is not analyzed, it is not possible to know the content of the packets (ALC/LCT packets) being transmitted in the FLUTE session. In contrast, in acquiring packets that are transmitted in a subsequent FLUTE session after receiving and analyzing the FDT, it is sometimes not possible to receive the desired packets. In particular, in cases where immediacy is required such as in live streaming and retransmission frequency of the same packet is low, that tendency increases.

Accordingly, if the reception side acquiring a FLUTE session were notified of the reception mode, such as "Necessary to acquire all packets (meaning since the same packets will not be resent or the retransmission frequency is low, it is better to receive alt packets)", it would be convenient for the reception side. However, presently such a method has not been established.

The present disclosure was achieved in view of the above circumstances, and is able to notify the reception side that acquires a FLUTE session of a reception mode.

Solution to Problem

According to a first aspect of the present disclosure, a content supply device that delivers content over FLUTE multicast includes: a fragment stream generating portion that generates a fragment stream on the basis of source data of the content; a FLUTE-stream generating portion that generates a FLUTE stream from the generated fragment stream; an SDP creation portion that creates an SDP including a reception mode in the case of a reception side receiving a FLUTE session including the FLUTE stream; and a multicast delivery portion that delivers the FLUTE steam over FLUTE multicast and, prior to delivery of the FLUTE stream over FLUTE multicast, delivers the SDP over FLUTE multicast.

The SDP creation portion can create the SDP including as the reception mode any of Promiscuous, One-copy, and Keep-updated.

The SDP creation, portion can create the SDP including as the reception mode any of Promiscuous, One-copy, Keep-updated, and combinations of the Promiscuous, the One-copy, and the Keep-updated.

The SDP creation portion can create the SDP additionally including an attribute type showing that the FLUTE session includes an elementary stream of a single media type.

The content supply device according to the first aspect of the present disclosure can further include: a unicast delivery portion that delivers over HTTP unicast the generated fragment stream.

According to the first aspect of the present disclosure, a content supply method of a content supply device that delivers content over FLUTE multicast includes: a fragment stream generating step of generating, by the content supply device, a fragment stream on the basis of source data of the content; a FLUTE-stream generating step of generating, by the content supply device, a FLUTE stream from the generated fragment stream; an SDP creation step of creating, by the content supply device, an SDP including a reception mode in the case of a reception side receiving a FLUTE session including the FLUTE stream; and a multicast delivery step of delivering, by the content supply device, the FLUTE stream over FLUTE multicast and, prior to delivery of the FLUTE stream over FLUTE multicast, delivering the SDP over FLUTE multicast.

According to the first aspect of the present disclosure, a program causes a computer that delivers content over FLUTE multicast to function as: a fragment stream generating portion that generates a fragment stream on the basis of source data of the content; a FLUTE-stream generating portion that generates a FLUTE stream from the generated fragment stream; an SDP creation portion that creates an SDP including a reception mode in the case of a reception side receiving a FLUTE session including the FLUTE stream; and a multicast delivery portion that delivers the FLUTE stream over FLUTE multicast and, prior to delivery of the FLUTE stream over FLUTE multicast, delivers the SDP over FLUTE multicast.

In the first aspect of the present disclosure, a fragment stream is generated on the basis of source data of content, a FLUTE stream is generated from the fragment stream that is generated, an SDP including the reception mode when the reception side receives a FLUTE session including the FLUTE stream is created, and the SDP is delivered over FLUTE multicast prior to FLUTE multicast delivery of the FLUTE stream.

According to a second aspect of the present disclosure, a terminal device receives and plays hack a FLUTE stream delivered over FLUTE multicast from a content supply device including a fragment stream generating portion that generates a fragment stream on the basis of source data of content, a FLUTE-stream generating portion that generates the FLUTE stream from the generated fragment stream, an SDP creation portion that creates an SDP including a reception mode in the case of a reception side receiving a FLUTE session including the FLUTE stream, and a multicast delivery portion that delivers the FLUTE stream over FLUTE multicast and, prior to delivery of the FLUTE stream over FLUTE multicast, delivers the SDP over FLUTE multicast. The terminal device acquires the SDP prior to reception of the FLUTE stream, and in accordance with the reception mode included in the SDP, receives the FLUTE stream.

In the case of acquiring the SDP prior to reception of the FLUTE stream, and the reception mode included in the SDP being promiscuous, the terminal device according to the second aspect of the present disclosure can receive all packets of the FLUTE session including the FLUTE stream.

In the second aspect of the present disclosure, an SDP is acquired prior to reception of the FLUTE stream, and in accordance with the reception mode included in the SDP, the FLUTE stream is received.

According to a third aspect of the present disclosure, a content supply system includes: a content supply device; and a terminal device. The content supply device includes a fragment stream generating portion that generates a fragment stream on the basis of source data of content, a FLUTE-stream generating portion that generates a FLUTE stream from the generated fragment stream, an SDP creation portion that creates an SDP including a reception mode in the case of a reception side receiving a FLUTE session including the FLUTE stream, and a multicast delivery portion that delivers the FLUTE stream over FLUTE multicast and, prior to delivery of the FLUTE stream over FLUTE multicast, delivers the SDP over FLUTE multicast. The terminal device acquires the SDP prior to reception of the FLUTE stream, and in accordance with the reception mode included in the SDP, receives the FLUTE stream.

In the third aspect of the present disclosure, by a content supply device, a fragment stream is generated on the basis of source data of content, a FLUTE stream is generated from the fragment stream that is generated, an SDP including the reception mode when the reception side receives a FLUTE session including the FLUTE stream is created, and the SDP is delivered over FLUTE multicast prior to FLUTE multicast delivery of the FLUTE stream. Also, by a terminal device, an SDP is acquired prior to reception of the FLUTE stream, and in accordance with the reception mode included in the SDP, the FLUTE stream is received.

Advantageous Effects of Invention

According to the first aspect of the present disclosure, it is possible to notify a reception side that acquires a FLUTE session of a reception mode.

According to the second aspect of the present disclosure, it is possible to inhibit the omission of packets transmitted in a FLUTE session.

According to the third aspect of the present disclosure, it is possible to deliver a content stream over FLUTE multicast.

DESCRIPTION OF EMBODIMENTS

Hereinafter, the best mode for carrying out the present disclosure (henceforth called the embodiment) will be described, but prior to that the scheme of packets being transmitted in a FLUTE session and an outline of the present embodiment will be described.

Figure 2:
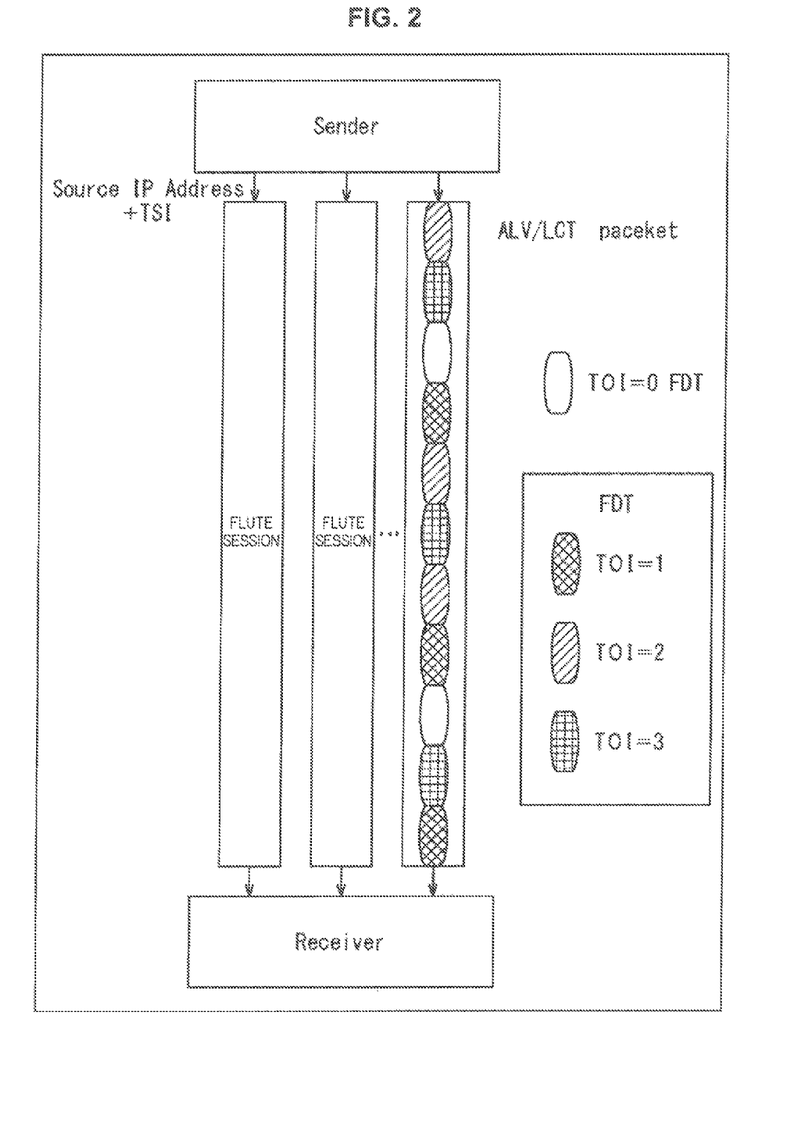
FIG. 2 is a drawing that shows an outline of the scheme in which packets are transmitted in a FLUTE session.

FIG. 2 shows an outline of the scheme of packets being transmitted in a FLUTE session. As shown in the drawing, in a FLUTE session specified by Source IP Address and TSI (Transport Session Identifier), ALC/LCT packets are transmitted. In each ALC/LCT packet, for example a video stream or audio stream is stored, and a unique TOI (Transport Object Identifier) is given m the FLUTE session. Note that it is specified that TOI=0 be given to ALC/LCT packets in which the FDT (File Delivery Table) is housed. For packets in which other data is stored, when the data source is the same, a common TOI is given. For example, a common TOI is given to all ALC/LCT packets in which a video stream is divided and housed. Similarly, a common TOI is given to all ALC/LCT packets in which an audio stream is divided and housed.

The FDT is periodically transmitted during a FLUTE session, with attribute information relating to date housed in ALC/LCT packets other than TOI=0 and information for reconstructing them being described therein.

The side receiving the FLUTE session obtains the TOI=0 FDT by the FLUTE session, and by analyzing the obtained FDT receives the desired ALC/LCT packets. For example, is the case of wanting to receive ALC/LCT packets in which a video stream is housed, it analyzes the FDT, confirms the TOI of the ALC/LCT packets in which the video stream is housed, acquires the ALC/LCT packets to which the TOI is given from the FLUTE session, performs reconstruction and playback.

However, in such a case, during acquisition and analysis of the FDT, the ALC/LCT packets in which a desired video stream is housed cannot be received, and so not being able to play back the desired video stream without drop-outs may occur. This is noticeable when the retransmission frequency of ALC/LCT packets is low, or when retransmission is not performed such as during live streaming.

Therefore, in the present embodiment, to transmit the elementary stream of a single media type by a FLUTE session, prior to acquiring the FLUTE session, using the SDP (Session Media Protocol) transmitted by the FLUTE presentation layer, it attempts to notify the reception side of the media type and reception mode.

Here, the three types of Promiscuous, One-copy, and Keep-update that are defined by 3GPP are envisioned as the reception modes.

Promiscuous is a reception, mode for urging the reception side to receive all ALC/LCT packets that are transmitted in a FLUTE session. Notification of the employment of promiscuous is assumed when for example the retransmission frequency of ALC/LCT packets is low, or when retransmission is not performed such as during live streaming.

One-copy is a reception mode for notifying the reception side that there is no need to monitor for the presence of an update to the ALC/LCT packets since there is no transmission of an update to the content of the ALC/LCT packets which have been once transmitted. Keep-updated is a reception mode for notifying the reception side that there is a need to monitor for the presence of an update to the ALC/LCT packets since there will be the transmission of an update to the content of the ALC/LCT packets which have been once transmitted.

Moreover, it is possible to add combinations of the aforementioned three types of reception modes, for example, Promiscuous+Keep-updated, to the receptions modes.

Configuration Example of Content Supply System

Figure 3:
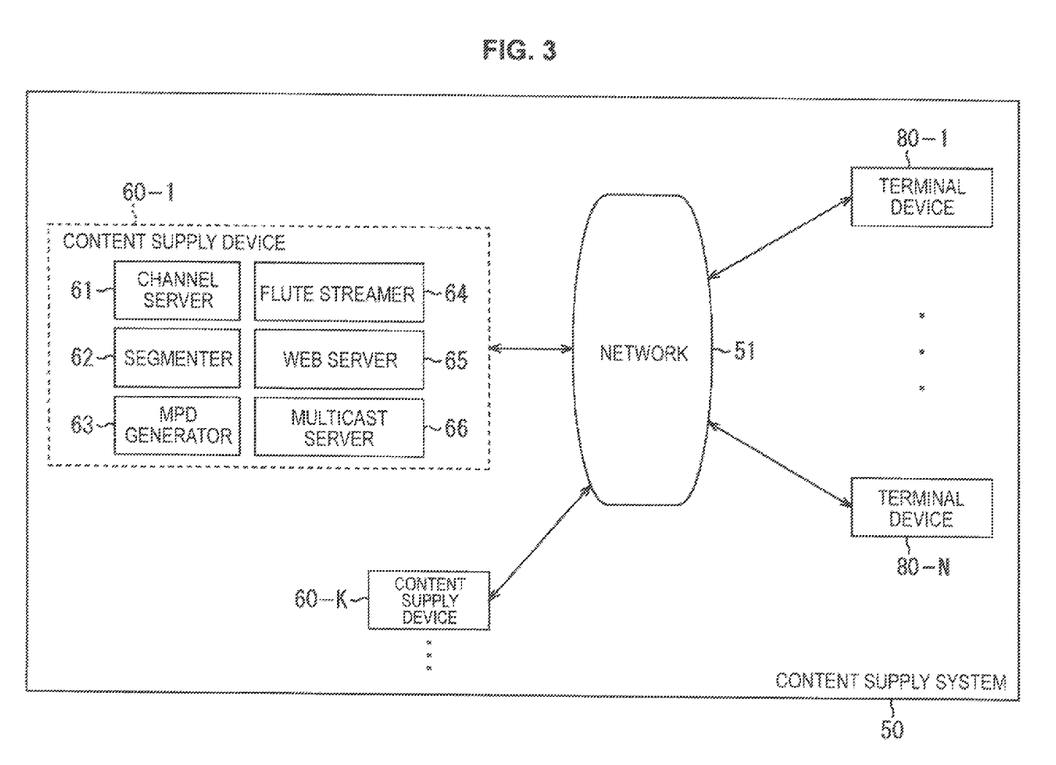
FIG. 3 is a block drawing that shows a configuration example of the content supply system that applies the present disclosure.

FIG. 3 shows a configuration example of the content supply system that is the embodiment of the present disclosure.

The contest supply system 50 is constituted, from a plurality of content supply devices 60 and a plurality of terminal devices 80. The content supply devices 60 and the terminal devices 80 can be connected via a network 51.

The network 51 is one that includes, besides a two-way communication network represented by the Internet and a CDN that uses it, various broadcast networks using terrestrial broadcasting, satellite broadcasting, and mobile broadcast (e)MBMS.

The content supply device 60 delivers content streams both over HTTP unicast and over FLUTE multicast, and has a channel server 61, a segmenter 62, an MPD generator 63, a FLUTE streamer 64, a WEB server 65, and a multicast server 66.

Note that the channel server 61 to the multicast server 66 that the content supply device 60 has may be arranged integrally in one location, and may be arranged distributed over the Internet or the like.

The channel server 61 generates a plurality of streaming data of differing bit rates from source data of the content for delivery to the terminal devices 80 and outputs them to the segmenter 62.

The segmenter 62, by dividing each streaming data temporally into segments, generates a segment stream such as Fragmented MP4 and outputs the generated segment stream to the FLUTE streamer 64 and the WEB server 65. Also, the segmenter 62 notifies the MPD generator 63 of metadata including an address that expresses the supply source of the file of the segment stream.

The FLUTE streamer 64 converts the segment streams sequentially input from the segmenter 62 to FLUTE streams and outputs them to the multicast server 66. In addition, the FLUTE streamer 64 stores the MPD generated by the MPD generator 63 in the FLUTE packets and outputs them to the multicast server 66. Furthermore, the FLUTE streamer 64 creates the SDP relating to the FLUTE session and outputs it to the multicast server 66.

The MPD generator 63, based on the metadata notified from the segmenter 62, generates an MPD that describes the address and the like expressing the supply source of the segment stream file (WEB server 65) and outputs it to the FLUTE streamer 64 and the WEB server 65. In this MPD is described the acquisition source of the SDP in which is described the source IP address, of the FLUTE session of the FLUTE stream delivered over FLUTE multicast, switchable from the segment stream delivered over HTTP unicast.

The WEB server 65, in accordance with the MPD request (HTTP request) from the terminal device 80, delivers over HTTP unicast the MPD inputted from the MPD generator 63 to the request source. Also, the WEB server 65, in accordance with the segment-stream request (HTTP request) from the terminal device 80, delivers over HTTP unicast the file of the segment stream to the request source.

The multicast server 66 delivers over FLUTE multicast the MPD. Also, the multicast server 66 delivers over FLUTE multicast the SDP. In addition, the multicast server 66 delivers over FLUTE multicast the FLUTE stream.

The terminal device 80 acquires the MPD from the content supply device 60 via the network 51. Specifically, it transmits an HTTP request, and in response either receives the MPD delivered over HTTP unicast, or receives the MPD delivered over FLUTE multicast. Note that when the terminal device 80 receives an MPD delivered over FLUTE multicast, announcement information containing the portal channel of the multicast server 66 performing the FLUTE multicast delivery is referenced.

The announcement information is well known via the interaction channel or broadcast/multicast channel by the USD (User Service Description) in MBMS when FLUTE multicast delivery is performed via a mobile broadcast (e)MBMS contained in the network 51. The announcement information is well known via the interaction channel or broadcast/multicast channel by the DVB-H(tPDC) ESG (Electronic Service Guide), when FLUTE multicast delivery is performed over a terrestrial broadcast or satellite broadcast contained in the network 51.

Also, the terminal device 80 requests a segment stream from the WEB server 65 based oft the acquired MPD, and in response receives and plays back the segment stream file delivered over HTTP multicast.

Moreover, the terminal device 80 acquires the SDP based on the acquired MPD, and receives and plays back the FLUTE stream delivered over FLUTE multicast based on the SDP. At this time, the reception mode described in the SDP is referenced, and so for example if the reception mode is Promiscuous, all of the ALC/LCT packets being transmitted in the corresponding FLUTE session are immediately received.

However, since it is possible that the reception side does not have a sufficient buffer for holding all of the ALC/LCT packets, it is left to the receiving side whether or not it executes an operation corresponding to the reception mode notified by the SDP.

SDP Description Example

Figure 4:
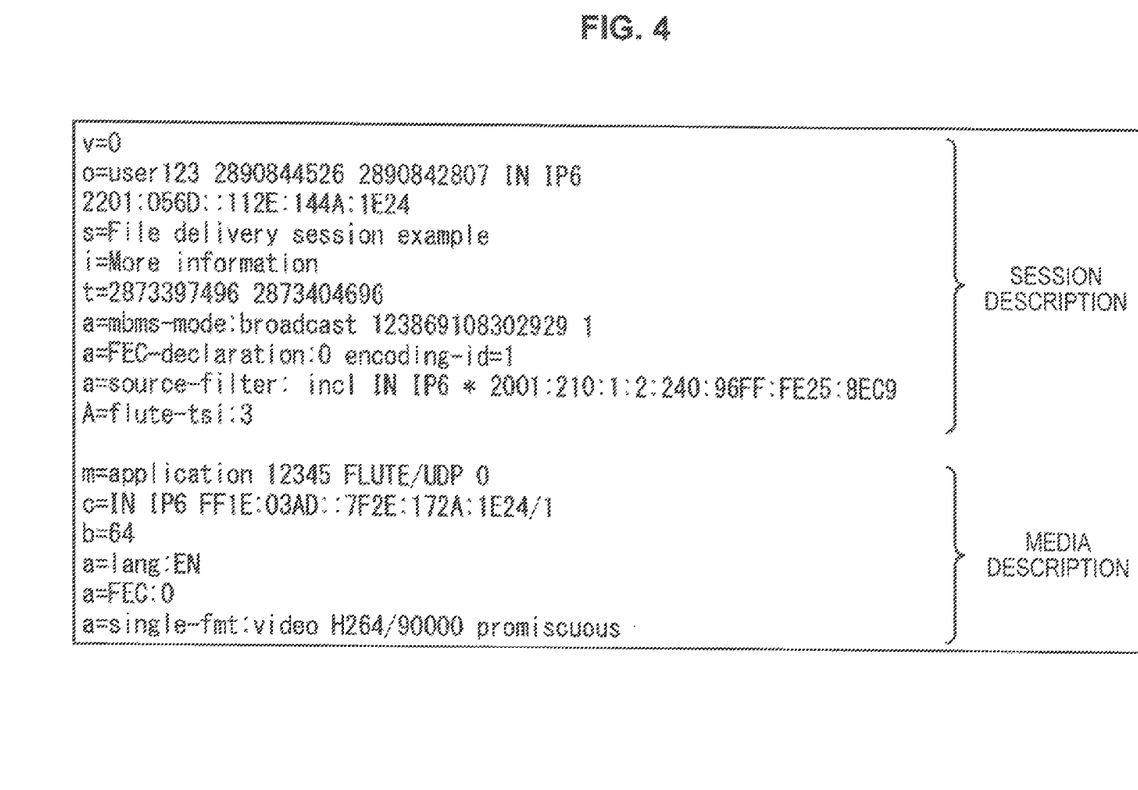
FIG. 4 is a drawing that shows an SDP description example.

Next, FIG. 4 shows a description example of an SDP.

The SDP is constituted from a session description and a media description, with each including a plurality of lines having as a basic constitution a single text string in the format of <Type>=<value>. <type> is designated by one alphabetic character, and expresses the meaning over the protocol that a line has. <value> is the character string that is described, and depending on the type of the corresponding <type>, a unique format and meaning are respectively specified.

For example, the meaning of the text described in <TYPE> of the session description is as follows.
v=(protocol version)
o=(transmission source and session identifier)
s=(session name)
i=(session information)
a=(attribute concerning entire session)
t=(time that session is active)

The meaning of the text described in <TYPE> of the media description is as follows.
m=(media name and transmission address)
c=(connection information—option when including in a session label option)
b=(ban information of 0 or more lines)
a=(attribute relating to media)

In the present embodiment, the attribute classification defined by the format shown below is introduced m the media description.
a=single-fmt:<media><encoding name><receive mode>
<media> shows the media type, describing for example video, audio and the like.
<encoding name> shows the encoding format, and describes H.264, H.261, GSM (registered trademark) and the like.
<promiscuous> shows the reception mode, and promiscuous, One-copy, or Keep-updated is described. Note that it is also possible to add a combination such as Promiscuous+ Keep-updated to the reception mode.
a=single-fmt:video H264/9000 promiscuous described in the example of FIG. 4 indicates that the media type is video, the encoding format is H.264, the time scale is 90 KHz, and the reception mode is promiscuous.

Note that a=single-fmt: <media><encoding name><receive mode> may also be introduced in the session description. In that case, the attribute classification is handled as information relating to the entire FLUTE session.

Operation of Content Supply System 50

Next, the operation of the content supply system 50 will be described.

Figure 5:
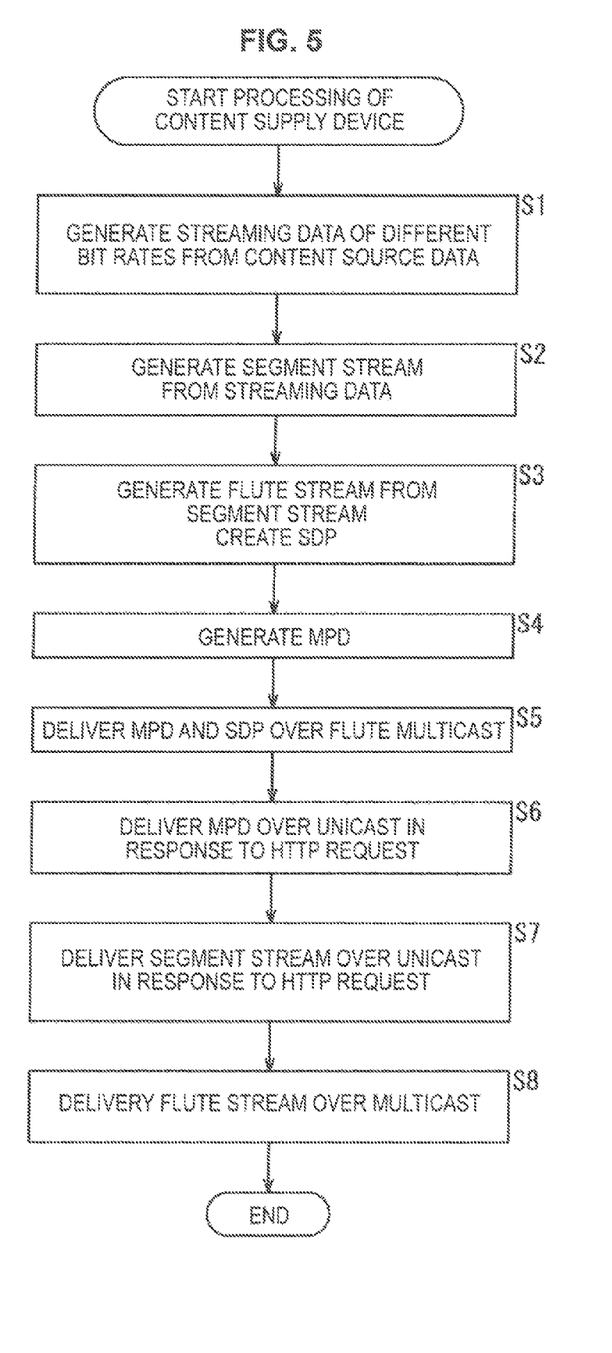
FIG. 5 is a flowchart that describes the processing of the content supply device.

FIG. 5 is a flowchart that describes the process of the contest supply device 60 delivering a segment stream of content over HTTP unicast, and delivering a FLUTE stream over FLUTE multicast (hereinbelow called the content supply device process).

In Step S1, the channel server 61 generates a plurality of streaming data of differing bit rates from the source data of the content for delivery to the terminal device 80 and outputs them to the segmenter 62. In Step S2, the segmenter 62 generates a segment stream such as fragmented MP4 based on each streaming data and outputs it to the FLUTE streamer 64 and the WEB server 65. Also, the segmenter 62 informs the MPD generator 63 of the metadata including the address showing the supply source of the segment stream.

In Step S3, the FLUTE streamer 64 converts the segment stream input from the segmenter 62 to a FLUTE stream and outputs it to the multicast server 66. Also, the FLUTE streamer 64 stores the MPD generated by the MPD generated 63 in the FLUTE packets and outputs them to the multicast server 66. Moreover, the FLUTE streamer 64 generates an SDP relating to the FLUTE session and outputs it the multicast server 66.

In Step S4, the MOP generator 63 generates an MPD describing the address expressing the supply source (WEB server 65) of the file of the segment stream being delivered over HTTP unicast, and the acquisition source of the SDP in which is described the source IP address of the FLUTE session of the FLUTE stream delivered over FLUTE multicast, switchable from the segment stream, and outputs it to the multicast server 66.

In Step S5, the multicast server 66 delivers the MPD and the SDP over FLUTE multicast.

In Step S6, in the case of there being an MPD request from the terminal device 80, the WEB server 65 delivers over HTTP unicast the MPD input from the MPD generator 63 to the request source.

When the terminal device 80 that received the MPD issues an HTTP request requesting a segment stream based on the MPD, in Step S7, the WEB server 65 delivers over HTTP unicast the file of the requested segment stream to the request source. The segment stream delivered over HTTP unicast is received and played back by the terminal device 80.

On the other hand, the multicast server 66, in step S8 delivers over FLUTE multicast the FLUTE stream. The FLUTE session including the FLUTE stream delivered over FLUTE multicast is received and played back by the terminal device 80 that acquires the SDP based on the acquired MPD and analysed the SDP, and in doing so the reception mode is Promiscuous, all of the ALC/LCT packets transmitted by the the reception mode is Promiscuous, all of the ALC/LCT packets transmitted by the corresponding FLUTE session are immediately received prior to acquisition and analysis of the FDT. However, it is left to the receiving side whether or not it executes an operation corresponding to the reception mode notified by the SDP, and the supply side may not forcefully control the operation of the terminal device 80.

As described above, according to the processing of the content supply device, prior to the terminal device 80 starting reception of a FLUTE session, it is possible to notify the terminal device 80 of the reception mode suited to the reception. Therefore, it is possible to inhibit the omission of ALC/LCT packets at the terminal device 80 side. Also, since this notification is not something that forcefully controls the operation of the terminal device 80 side, it is possible to inhibit the triggering of the state such that the buffer on the terminal device 80 side overflows.

The content supply device 60 that executes a series of processes described above and the terminal device 80 can be realized by a computer executing software, in addition to constituting them with hardware. A computer built with special-purpose hardware, or for example a general-purpose personal computer or the like capable of executing various functions by installing various programs are included in such a computer.

Figure 6:
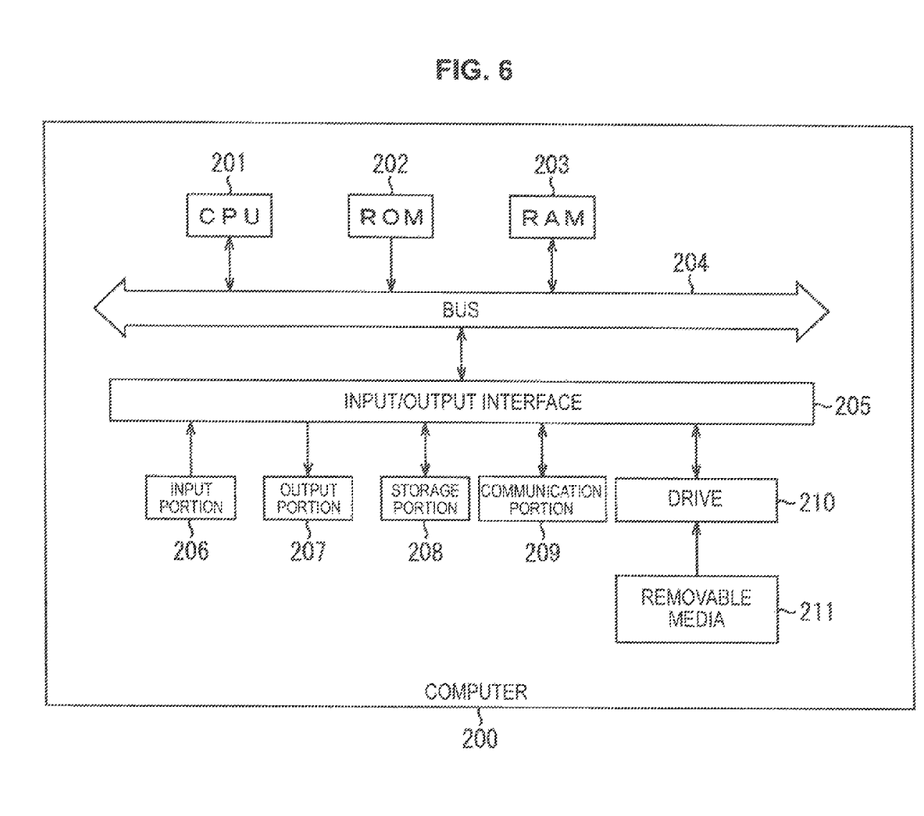
FIG. 6 is a block drawing that shows a configuration example of a computer.

FIG. 6 is a block drawing that shows a configuration example of hardware of she aforementioned computer.

In this computer 200, a CPU (Central Processing Unit) 201, ROM (Read Only Memory) 202, and RAM (Random Access Memory) 203 are connected to each other by a bus 204.

An input/output interface 205 is also connected to the bus 204. An input portion 206, an output portion 207, a storage portion 208, a communication portion 209, and a drive 210 are connected to the input/output interface 205.

The input portion 206 includes a keyboard, a mouse, a microphone or the like. The output portion 207 includes a display, a speaker, or the like. The storage portion 208 includes a hard disk, a non-volatile memory, or the like. The communication portion 209 includes a network interlace or the like. The drive 210 drives a removable media 211 such as a magnetic disk, an optical disk, a magnetic-optical disk, or a semiconductor memory.

In the computer 200 that is constituted in the above manner, the CPU 201 loads and executes a program stored in the storage portion 208 via the input/output interface 205 and the bus 204, whereby the aforementioned series of processes are performed.

The program that the computer 200 (CPU 201) executes may be provided by being recorded for example on die removable media 211 such as a package media. Alternatively, the program may be provided via a wired or wireless transmission medium such as a local area network, the Internet, and a digital satellite broadcast.

The program may be installed in the storage portion 208 via fee input/output interface 205 by loading the removable media 211 in the drive 210. Also, the program can be received by the communication portion 209 via a wined or wireless transmission medium and installed in the storage portion 208. In addition, the program can also be installed in advance in the ROM 202 or the storage portion 208.

The program executed by the computer 200 may be a program in which the processing is performed in chronological order in the sequence described in the present specification, or a program in which the processing is performed in parallel or at a required timing, such as when called.

An embodiment of the present disclosure is not limited to the above embodiment, and may assume various alterations within the scope of the present disclosure.

Additionally, the present technology may also be configured as below.

(1)

A content supply device that delivers content over FLUTE multicast, the content supply device including:

a fragment stream generating portion that generates a fragment stream on the basis of source data of the content;

a FLUTE-stream generating portion, that generates a FLUTE stream from the generated fragment stream;

an SDP creation portion that creates an SDP including a reception mode in the case of a reception side receiving s FLUTE session including the FLUTE stream; and a multicast delivery portion that delivers the FLUTE stream over FLUTE multicast and, prior to delivery of the FLUTE stream over FLUTE multicast, delivers the SDP over FLUTE multicast.

(2)

The content supply device according to (1), wherein the SDP creation portion creates the SDP including as the reception mode any of Promiscuous, One-copy, and Keep-updated.

(3)

The content supply device according to (1), wherein the SDP creation portion creates the SDP including as the reception mode any of Promiscuous, One-copy, Keep-updated, and combinations of the Promiscuous, the One-copy, and the Keep-updated.

(4)

The content supply device according to any of (1) to (3), wherein the SDP creation portion creates the SDP additionally including an attribute type showing that the FLUTE session includes an elementary stream, of a single media, type.

(5)

The content supply device according to any of (1) to (4), further including:

a unicast delivery portion that delivers over HTTP unicast the generated fragment stream.

REFERENCE SIGNS LIST 50 content supply system
51 network 60 content supply device
61 channel server
62 segmenter
63 generator
64 FLUTE streamer
65 WEB server
66 multicasting server
80 terminal device
200 computer
201 CPU

The invention claimed is:

1. A content supply device that delivers content over File Delivery over Unidirectional Transport (FLUTE) multicast, the content supply device comprising:
   circuitry configured to:
   generate a fragment stream based on source data of the content;
   generate a FLUTE stream from the generated fragment stream;
   create a Session Description Protocol (SDP) including a reception mode for receiving devices to receive a FLUTE session that carries only one stream of a single media type;
   prior to delivery of the FLUTE stream over FLUTE multicast, deliver the SDP that is received by a receiving device that receives packets of the FLUTE session over FLUTE multicast according to the reception mode, the FLUTE session and media information in the SDP; and deliver the FLUTE stream over FLUTE multicast.

2. The content supply device according to claim 1, wherein the SDP creation creates the SDP including as the reception mode any of Promiscuous, One-copy, and Keep-updated.

3. The content supply device according to claim 1, wherein the SDP creation creates the SDP including as the reception mode any of Promiscuous, One-copy, Keep-updated, and combinations of the Promiscuous, the One-copy and the Keep-updated.

4. The content supply device according to claim 2, wherein the SDP creation creates the SDP additionally including an attribute type showing that the FLUTE session includes an elementary stream of the single media type.

5. The content supply device according to claim 2, farther comprising: a unicast delivery that delivers over HTTP unicast the generated fragment stream.

6. A content supply method of a content supply device that delivers content over File Delivery over Unidirectional Transport (FLUTE) multicasts, the content supply method comprising:
   generating, by the content supply device, a fragment stream based on source data of the content;
   generating, by the content supply device, a FLUTE stream, from the generated fragment stream;
   creating, by the content supply device, a Session Description Protocol (SDP) including a reception mode for receiving devices to receive a FLUTE session that carries only one stream of a single media type;
   delivering, by the content supply device, prior to delivery of the FLUTE stream over FLUTE multicast, delivering the SDP that is received by a receiving device that receives packets of the FLUTE over FLUTE multicast according to the reception mode, the FLUTE session and media information in the SDP; and
   delivering, by the content supply device, the FLUTE stream over FLUTE multicast.

7. A non-transitory computer readable medium storing a program thereon that, when executed by a computer, causes the computer to perform a method for delivering content over File Delivery over Unidirectional Transport (FLUTE), the method comprising:
   generating a fragment stream based on source data of the content;
   generating a FLUTE stream from the generated fragment stream;
   creating a Session Description Protocol (SDP) including a reception mode of for receiving devices to receive a FLUTE session that carries only one stream of a single media type;
   prior to delivery of the FLUTE stream over FLUTE multicast, delivering the SDP that is received by a receiving device that receives packets of the FLUTE session over FLUTE multicast according to the reception mode, the FLUTE session and media information in the SDP; and
   delivering the FLUTE stream over FLUTE multicast.

8. A receiving device including: circuitry configured to:
   receive a Session Description Protocol (SDP) including a reception mode for receiving devices to receive a File Delivery over Unidirectional (FLUTE) session that caries only one stream of a single media type, and
   after receiving the SDP, receive packets of the FLUTE session over FLUTE multicast according to the reception mode, the FLUTE session and media information in the SDP.

9. The receiving device according to claim 8, wherein the reception mode is a first mode, and the circuitry is further configured to receive the FLUTE stream by receiving all packets of the FLUTE session including the FLUTE stream.

10. The receiving device according to claim 8, wherein the reception mode is a second mode and the circuitry is further configured not to monitor an update of a packet of the FLUTE stream.

11. The receiving device according to claim 8, wherein the reception node is a third mode and the circuitry is further configured to monitor an update of a packet of the FLUTE stream.

12. The receiving device according to claim 8, wherein the reception mode is a combination of the first and second modes and the circuitry is further configured to receive the FLUTE stream by receiving all packets of the FLUTE session without monitoring an update of a packet of the FLUTE stream.

13. The receiving device according to claim 8, wherein the reception node is a combination of the first and third modes and the circuitry is further configured to receive the FLUTE stream by receiving all packets of the FLUTE session and monitor an update of a packet of the FLUTE stream.

14. A content supply system comprising: a content supply device:
   a content supply device; and
   terminal device;
   wherein the content supply device includes circuitry configured to:
   generate a fragment stream based on source data of content;
   generate a File Delivery over Unidirectional Transport (FLUTE) stream from the generated fragment stream;
   create a Session Description Protocol (SDP) including a reception mode for receiving devices to receive a FLUTE session that caries only one stream of a single media type;

prior to delivery of the FLUTE stream over FLUTE multicast, deliver the SDP that is received by a receiving device that receives packets of the FLUTE session over FLUTE multicast according to the reception mode, the FLUTE session and media information in the SDP; and deliver the FLUTE stream over FLUTE multicast, wherein the terminal device acquires the SDP prior to reception of the FLUTE stream, and in accordance with the reception mode included in the SDP, receives the FLUTE stream.

15. A receiving method comprising:

receiving, by a receiving device, a Session Description Protocol (SDP) including a reception mode for receiving devices to receive a File Delivery over Unidirectional (FLUTE) session that carries only one stream of a single media type, and after receiving the SDP, receiving packets of the FLUTE session over FLUTE multicast according to the reception mode, the FLUTE session and media information in the SDP.

16. The receiving method according to claim 15, wherein the reception mode is a first mode, and the receiving method further comprises receiving the FLUTE stream by receiving all packets of the FLUTE session including the FLUTE stream.

17. The receiving method according to claim 15, wherein the reception mode is a second mode, and an update of a packet of the FLUTE stream is not monitored.

18. The receiving method according to claim 15, wherein the reception mode is a third mode, and the receiving method further comprises monitoring an update of a packet of the FLUTE stream.

19. The receiving method according to claim 15, wherein the reception mode is a combination of a first mode and a third mode, and the receiving method further comprises receiving the FLUTE stream by receiving all packets of the FLUTE session including the FLUTE stream and monitoring an update of a packet of the FLUTE stream.

20. The receiving method according to claim 15, wherein the reception mode is a combination of a first mode and a second mode, and the receiving method further comprises receiving the FLUTE stream by receiving all packets of the FLUTE session including the FLUTE stream and not monitoring an update of a packet of the FLUTE stream.

* * * * *